(12) United States Patent
Kim

(10) Patent No.: US 9,136,513 B2
(45) Date of Patent: Sep. 15, 2015

(54) BATTERY PACK

(75) Inventor: Taeyong Kim, Yongin-si (KR)

(73) Assignees: SAMSUNG SDI CO., LTD., Suwon-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 934 days.

(21) Appl. No.: 13/067,174

(22) Filed: May 13, 2011

(65) Prior Publication Data

US 2012/0003505 A1    Jan. 5, 2012

(30) Foreign Application Priority Data

Jul. 1, 2010  (KR) .................. 10-2010-0063611

(51) Int. Cl.
| | | |
|---|---|---|
| *H01M 10/42* | (2006.01) | |
| *H01M 2/10* | (2006.01) | |
| *H01M 2/20* | (2006.01) | |
| *H01M 2/30* | (2006.01) | |

(52) U.S. Cl.
CPC ............ *H01M 2/1077* (2013.01); *H01M 2/206* (2013.01); *H01M 2/305* (2013.01); *H01M 10/425* (2013.01)

(58) Field of Classification Search
CPC . H01M 10/425; H01M 2/1077; H01M 2/206; H01M 2/305
USPC .............................. 429/7, 153, 161, 163, 170
See application file for complete search history.

(56) References Cited

U.S. PATENT DOCUMENTS

| | | | |
|---|---|---|---|
| 2006/0214631 A1* | 9/2006 | Yoon et al. ..................... | 320/112 |
| 2010/0151299 A1 | 6/2010 | Ha et al. | |
| 2011/0076540 A1* | 3/2011 | Ronning et al. ............... | 429/120 |

FOREIGN PATENT DOCUMENTS

| | | |
|---|---|---|
| JP | 2010-503970 A | 2/2010 |
| WO | WO 2008/035872 A1 | 3/2008 |

OTHER PUBLICATIONS

Korean Office Action in KR 10-2010-0063611, dated Aug. 30, 2011 (KIM).

* cited by examiner

*Primary Examiner* — Ladan Mohaddes

(74) *Attorney, Agent, or Firm* — Lee & Morse, P.C.

(57) ABSTRACT

A battery pack includes one or more battery cells arranged in one direction and electrically connected to one another, a battery management system (BMS) substrate connected to electrode terminals of the battery cells and configured to control charging and discharging of the battery cells, a housing with a space to receive the battery cells, an upper cover connected to an upper part of the housing, and a connector connected to the BMS substrate, the connector protruding above and extending along an upper surface of the upper cover.

18 Claims, 8 Drawing Sheets

BATTERY PACK

BACKGROUND

1. Field

Embodiments relate to a battery pack.

2. Description of the Related Art

In general, a medium battery pack constituted by a plurality of battery cells is used as a power device, e.g., for an electric bike or an electric motor cycle. The battery pack may include a plurality of chargeable battery cells, a housing adapted to receive the battery cells, and a battery management system (BMS) substrate adapted to monitor the battery cells.

The battery cell may be, e.g., a lithium ion battery, a lithium polymer battery, or a lithium ion polymer battery. The housing may be formed by injection molding of plastic to minimize its weight. Additionally, the BMS substrate may be electrically connected with the battery cells to control electrical charging and discharging of the battery cells and to calculate the capacity of the battery cells.

SUMMARY

Embodiments are directed to a battery pack. The battery pack may include one or more battery cells arranged in one direction and electrically connected to one another, a battery management system (BMS) substrate connected to electrode terminals of the battery cells and configured to control charging and discharging of the battery cells, a housing with a space to receive the battery cells, an upper cover connected to an upper part of the housing, and a connector connected to the BMS substrate, the connector protruding above and extending along an upper surface of the upper cover.

The connector may include connection terminals on a surface facing the upper cover, the connection terminals being electrically connected with the electrode terminals of the battery cells.

The connector may include a connector body disposed parallel with the BMS substrate, and a bent part connected to the connector body and disposed parallel with the upper cover, the bent part including connection terminals on a lower surface thereof and connected with the electrode terminals of the battery cells.

The BMS substrate may be connected to an electrode terminal of a first one of the battery cells and to an electrode terminal of a last one of the battery cells through power lines, the electrode terminals of the first and last battery cells having opposite polarities.

The connector may be connected to the power lines.

The connector may overlap the BMS substrate and the upper surface of the upper cover.

The connector may electrically connect the BMS substrate to a device external to the battery pack.

A portion of the connector overlapping the BMS substrate may be connected to the BMS substrate, and a portion of the connector overlapping the upper cover may be electrically connected to the external device.

The connector may have a bent shape, a first side of the connector being attached to the BMS substrate and a second side of the connector being bent with respect to the first side and protruding above the upper cover.

The battery pack may further include a front cover connected to a front of the housing to enclose the BMS substrate.

The front cover may include a connector protruding hole, the connector extending from the BMS substrate and protruding through the connector protruding hole.

The front cover may include a connection recess, a connector of an adjacent battery pack corresponding to and connecting to the connection recess.

The connection recess may be electrically connected with the electrode terminals of the battery cells through the BMS substrate.

The connection recess may be electrically connected with connection terminals of the connector.

The connection recess may further include a coupling member, the coupling member being connected to the connection recess when the front cover is connected with an external device.

The coupling member may be a key box.

The coupling member may be connected with at least one of the electrode terminals of the battery cells via the connection recess.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
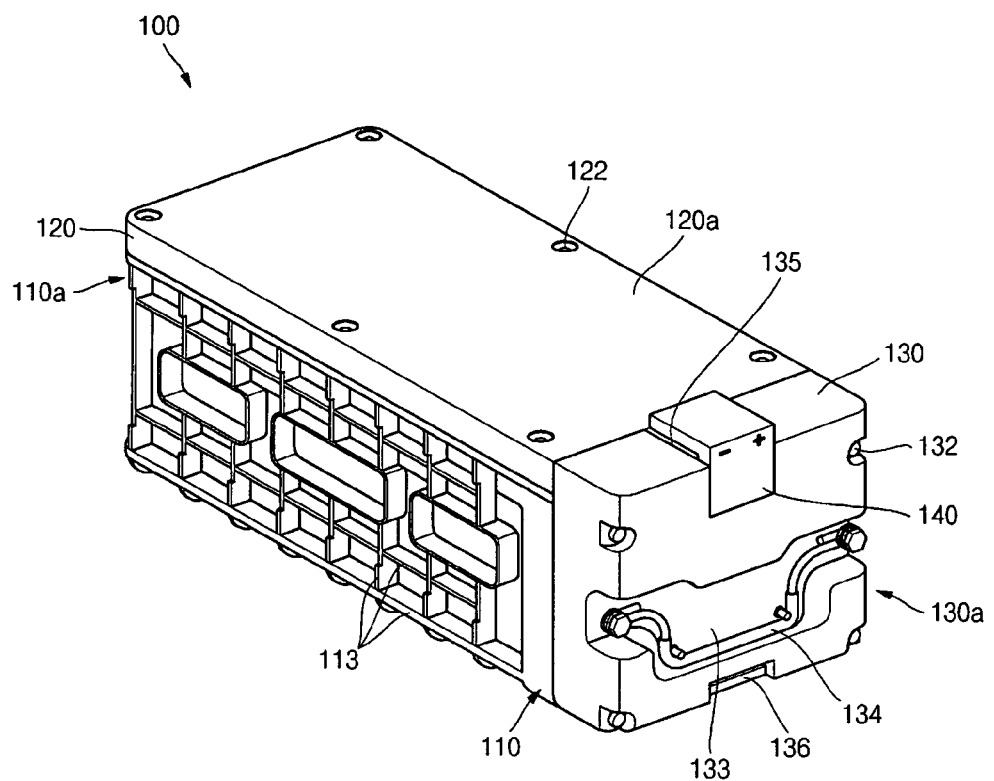
FIG. 1 illustrates a perspective view of a battery pack according to an embodiment.

Korean Patent Application No. 10-2010-0063611 filed on Jul. 1, 2010, in the Korean Intellectual Property Office, and entitled: "Battery Pack" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, embodiments will be described in detail with reference to the accompanying drawings. The structure of a battery pack according to one embodiment will now be described.

FIG. 1 illustrates a perspective view of a battery pack. Referring to FIG. 1, the battery pack 100 may include a housing 110 adapted to receive a plurality of battery cells, an upper cover 120 adapted to cover an upper part 110a of the housing 110, a front cover 130 adapted to cover a front 130a of the housing 110, and a connector 140 protruding to one side of the front cover 130. A plurality of reinforcing parts 113 may protrude on an outer surface of the housing 110 to improve stiffness, e.g., rigidity, of the housing 110.

The upper cover 120 may be connected to the housing 110 through a plurality of bolts 122. The upper cover 120 may be connected to the upper part 110a of the housing 110.

The front cover 130 may be connected to the housing 110 also through a plurality of bolts 132. The front cover 130 may additionally include a handle 134 formed in a receiving recess 133 to enable a user to conveniently separate, carry, and reconnect the battery pack 100. Being disposed within the receiving recess 133, the handle 134 does not protrude to the outside when not in use.

The front cover 130 may further include a connector protruding hole 135. The connector protruding hole 135 may be disposed at an upper end of the front cover 130, e.g., the connector protruding hole 135 may extend from an upper surface of the front cover 130 to a predetermined depth, so the connector 140 may be inserted in the connector protruding hole 135 to protrude upward through the connector protruding hole 135. That is, the connector 140 may be exposed to the outside of the battery pack 100 in a protruding manner through the connector protruding hole 135, e.g., an upper surface of the connector 140 may be at a higher level than the upper surface of the front cover 130.

In addition, a connection recess 136 may be formed at a lower end of the front cover 130 for connection with a connector 140 of a device external to the battery pack 100, e.g., another battery pack 100 or a load (such as a charger or a motor) adjoining thereto. For example, when two battery packs 100 are aligned on top of each other, a protruding portion of the connector 140 in a lower battery pack 100 may be inserted into the connection recess 136 of an upper battery pack 100. The connection recess 136 may be shaped to correspond to the connector 140 and may be connected with an electrode terminal 181 of the battery pack 100 through a wire. Therefore, when the connector 140 of one battery pack 100 is inserted in the connection recess 136 of an adjacent battery pack 100, the connection recess 136 and the connector 140 are electrically interconnected to electrically interconnect the corresponding adjacent battery packs 100. Furthermore, the connection recess 136 may be connected to a coupling member so that the battery pack 100 may be electrically and/or physically connected with an external device.

Figure 2:
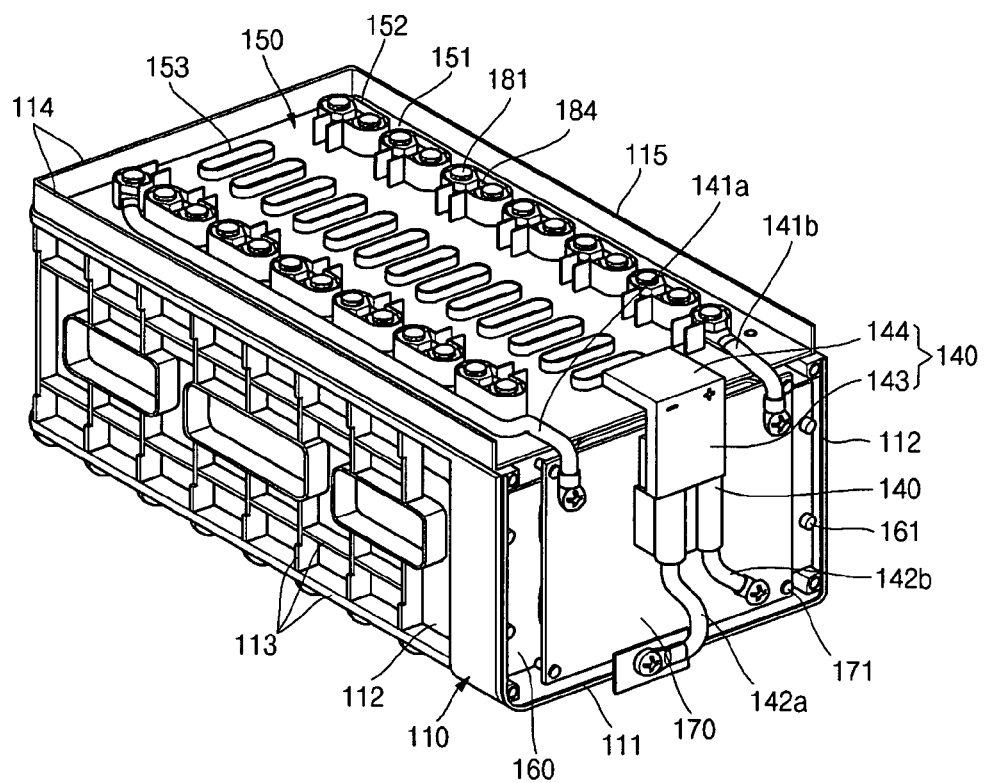
FIG. 2 illustrates a perspective view of the battery pack in FIG. 1, from which an upper cover and a front cover are removed.

The connector 140 may protrude upward at one side of the front cover 130, and may bend, e.g., to have a L-shaped cross section, to extend parallel with the upper cover 120. That is, as illustrated in FIG. 2, a first portion 144 of the connector 140 may extend in parallel to the upper cover 120, and a second portion 143 of the connector 140 may be connected to the first portion 144 and may extend perpendicularly to the upper cover 120. As the connector 140 is engaged with the connection recess 136 of the battery pack 100, the battery pack 100 according to the embodiment may be connected with another battery pack 100 or an external device (a load such as a charger or a motor). The structure and the operation of the connector 140 will be described hereinafter.

FIG. 2 illustrates a perspective view of the battery pack 100. It is noted that the upper cover 120 and the front cover 130 shown in FIG. 1 are removed from the view shown in FIG. 2.

Referring to FIG. 2, the housing 110 of the battery pack 100 may include one bottom part 111 and a plurality of sidewall parts 112, e.g., three sidewall parts 112, connected with the bottom part 111. The sidewall parts 112 may be formed by extending three edges of the bottom part 111 by a predetermined length. For example, the battery cells may be received in an inner space defined by the bottom part 111 and three sidewall parts 112. The front 130a, i.e., a side including the connector 140, and the upper part 110a of the housing 110 may be open.

An upper connection part 114 may protrude by a predetermined length along upper ends of the three sidewall parts 112 to be connected with the upper cover 120. In addition, a middle cover 150 may be connected to the upper part 110a of the housing 110, i.e., to an inside of the upper connection part 114. A plurality of the battery cells may be disposed in a space defined by the middle cover 150 and the housing 110. The middle cover 150 may include a main body 151 having a substantial plate shape, bus bar receiving parts 152 formed at the main body 151 to receive a plurality of bus bars 184, and gas discharge holes 153 formed on the main body 151 at positions corresponding to safety vents of the battery cells. The bus bars 184 electrically connect electrode terminals 181 of respective neighboring battery cells to each other. Power lines 141a and 141b may each be connected to particular ones of the bus bars 184 with respective first ends thereof.

An end plate 160 and a battery management system (BMS) substrate 170 may be provided at the front 130a of the housing 110. The power lines 141a and 141b may be connected to the BMS substrate 170 with second ends thereof, i.e., ends opposite respective first ends. The connector 140 may be electrically connected to the BMS substrate 170 through other power lines 142a and 142b. The BMS substrate 170 may include thereon a plurality of electrical parts adapted to control charging and discharging of the battery cells and calculate capacity of the battery cells. The BMS substrate 170 may include a plurality of connection holes 171 disposed on peripheral positions thereof and may be connected to the housing 110 through a plurality of bolts 172.

Figure 3:
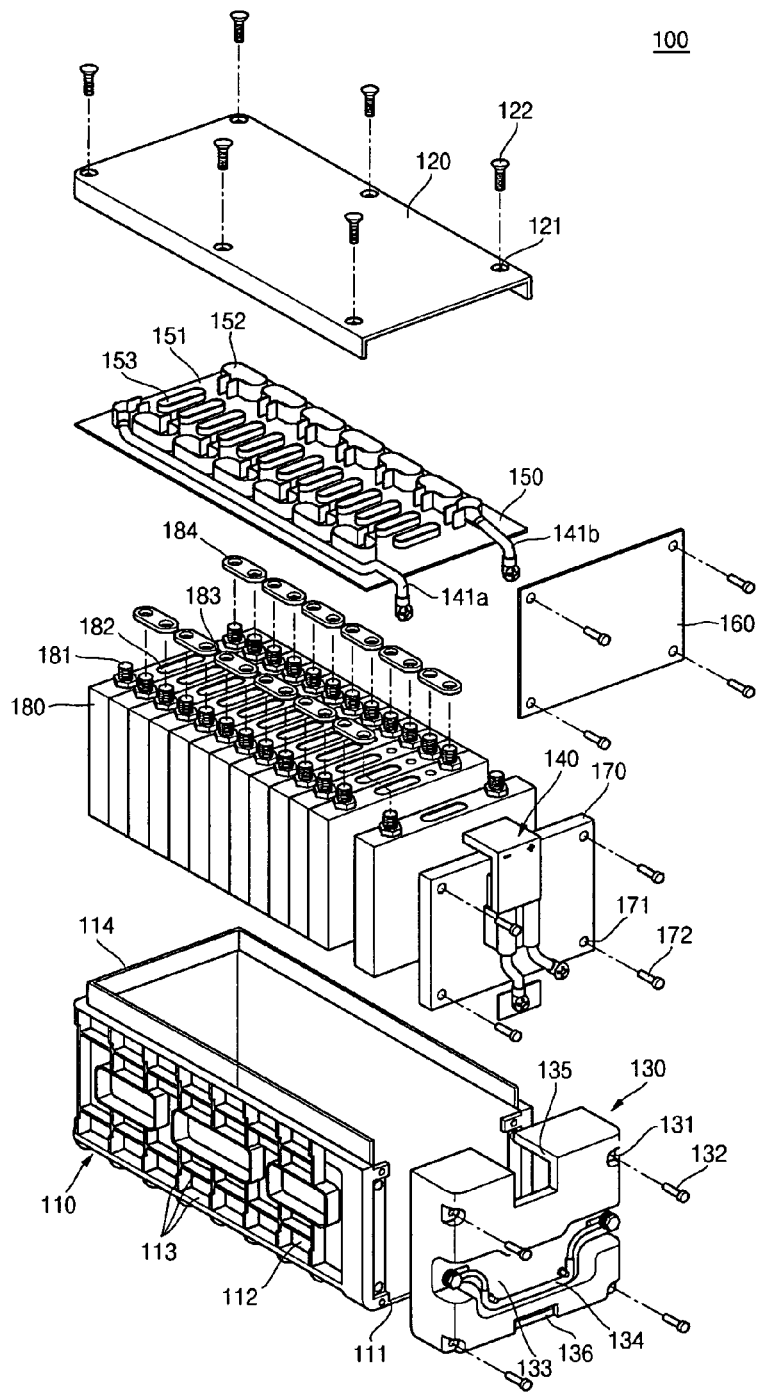
FIG. 3 illustrates an exploded perspective view of a battery pack according to an embodiment.

FIG. 3 illustrates an exploded perspective view of the battery pack 100. Referring to FIG. 3, a plurality of battery cells 180 may be inserted in the space defined by the housing 110 and the middle cover 150. The end plate 160 may be disposed in front of the battery cells 180. The BMS substrate 170 and the connector 140 may be connected in front of the end plate 160.

The end plate 160 may bring the battery cells 180 into close contact with the sidewall part 112 of the housing 110. For example, the end plate 160 may bring the plurality of battery cells 180 into close contact with the sidewall part 112 of the housing 110 which is facing the end plate 160. The end plate 160 may include connection holes 161 (FIG. 2) to be connected with the housing 110 through a plurality of bolts 162 engaged with the connection holes 161.

The battery cells 180 may be disposed between the housing 110 and the middle cover 150. Each battery cell 180 may include an electrode terminal 181, a safety vent 182, and an electrolyte injection cap 183. The battery cells 180 may be provided in plural, and may be serially connected with one another through the bus bar 184. Two of the electrode terminals 181 may be connected to the BMS substrate 170 and the connector 140 through the power lines 141a and 141b to perform charging and discharging. The end plate 160 and the battery cells 180 may be covered with the housing 110 and the front cover 130. Here, the front cover 130 may be connected to the housing 110 through engagement between connection holes 131 and the bolts 132.

Figure 4:
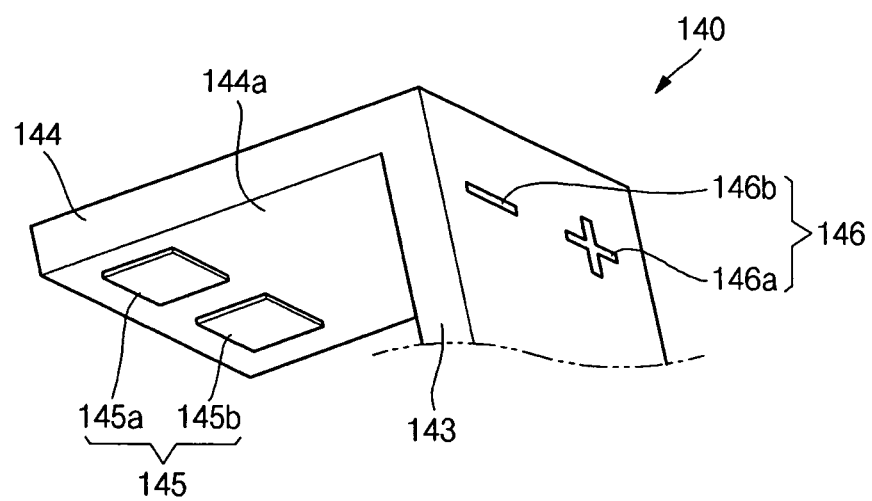
FIG. 4 illustrates an enlarged view of a connector of a battery pack according to an embodiment.

FIG. 4 illustrates an enlarged view of the connector 140 of the battery pack 100. Referring to FIGS. 2-4, the connector 140 may include a connector body 143 and a bent part 144. The body part 143 and the bent part 144 may correspond to the second and first portions of the connector 140, respectively.

The connector body 143 may be connected to the BMS substrate 170 through the power lines 142a and 142b. The connector body 143 is substantially parallel with the BMS substrate 170 and protruded more than an upper part of the BMS substrate 170. The connector body 143 may include a wire pattern therein. An outside of the connector body 143 may be made of an insulating material. The connector body 143 may be connected to a cathode and an anode of the electrode terminal 181 applied through the power lines 142a and 142b.

The bent part 144 may be bent by about 90° with respect to the connector 143. The bent part 144 may extend in a direction parallel with upper surfaces of the middle cover 150 and the upper cover 120. The bent part 144 may protrude upward of the upper cover 120, i.e., the bent part 144 may be positioned above an upper surface 120a of the upper cover 120, thereby being connected with the connection recess 136 of the battery pack 100 adjoining thereto or with an external device. That is, the bent part 144 may be capable of achieving a serial and/or parallel connection with the battery pack 100 and performing charging and discharging operations.

Additionally, a pair of connection terminals 145 may be formed at a lower part of the bent part 144, i.e., the connection terminals 145 may be formed on a lower surface 144a of the bent part 144 that is facing the upper cover 120. The connection terminals 145 include an anode terminal 145a and a cathode terminal 145b. Polarities of the connection terminals 145 may be changed according to an internal wiring structure. The connection terminals 145 are electrically connected by contact with the connection recess 136 of the battery pack 100 adjoining to the bent part 144 or with an external device (a load such as a charger or a motor). A polarity indicator 146 may be further provided on a surface of the bent part 144 opposite to a surface where the connection terminals 145 are formed to indicate the polarities of the connection terminals 145. The polarity indicator 146 may include an anode indicator 146a and a cathode indicator 146b.

As described above, the battery pack 100 may be individually connected with an external device by connecting the connector 140 to the battery pack 100, i.e., via the body part 143, and the external device, i.e., via the bent part 144. Alternatively, a plurality of the battery packs 100 may be interconnected in a serial or parallel manner via the connector 140.

Figure 5A:
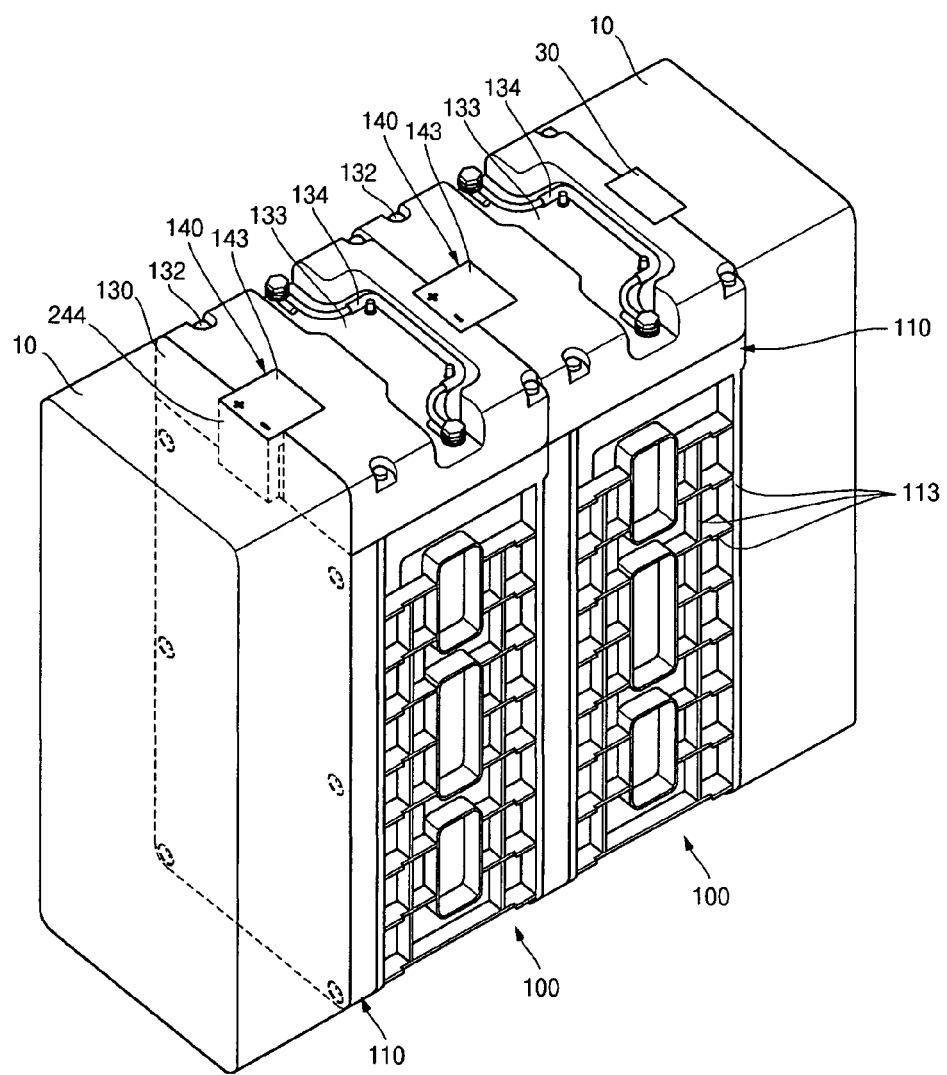
FIG. 5A illustrates a perspective view of a battery pack connected with an external device.
Figure 5B:
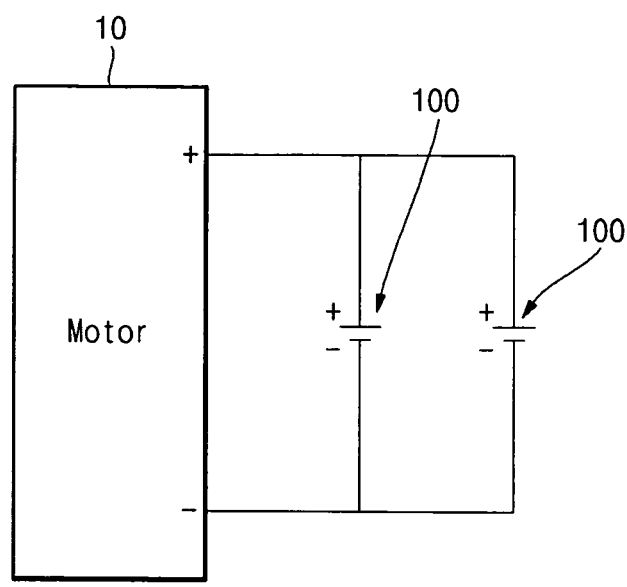
FIG. 5B illustrates a schematic circuit view of a connection state between the battery pack according to the embodiment and the external device.

FIG. 5A illustrates a perspective view of the battery pack 100 connected with an external device. FIG. 5B illustrates a schematic circuit diagram of the connection between the battery pack 100 and the external device.

Referring to FIG. 5A, two battery packs 100 may be electrically connected to each other. Specifically, the battery packs 100 may be interconnected via the connector 140, e.g., a connector 140 of a right battery pack 100 may be engaged with a connection recess 136 (FIG. 3) of a left battery pack 100. Here, the connection terminals of the connector 140 may be connected with connection terminals of the connection recess, respectively. Therefore, the parallel electric connection between the two battery packs 100 may be achieved without requiring a dedicated wire.

An external device, e.g., a motor 10, may be connected to a left side of the battery pack 100. The motor 10 may also include a connection recess adapted to receive the connector 140 of the battery pack 100, thereby achieving electrical connection between the motor 10 and the battery pack 100.

Thus, the electrical connection relations between the battery pack 100 and the motor 10 shown in FIG. 5A may be illustrated by the circuit view of FIG. 5B. For example, in a case where capacities of the battery packs 100 are 48V and 2 kW, respectively, a voltage of about 48V and an electric power of about 2 kW may be respectively supplied to the motor 10 since the battery packs 100 are connected in parallel.

A coupling member 30 may physically connect the battery pack 100 with the motor 10, accordingly constituting a key box to prevent theft of the battery pack 100. However, since the key box is an optional part, the battery pack 100 may be connected with the motor 10 without a dedicated connection recess formed at the front cover 130 and a dedicated coupling member.

As described above, the battery pack 100 may include the connector 140 protruding upward of the front cover 130 and bending to extend parallel with the upper surface 120a of the upper cover 120 and the connection recess 136 disposed at the lower end of the front cover 130 corresponding to the connector 140. Therefore, connection between a plurality of the battery packs 100 or between the battery pack 100 and the motor 10 is achieved in a simple manner by insertion of the connector 140 without requiring a separate wire. In addition, since connection and separation of the battery pack 100 is easy, a user may be able to easily separate for charging and reconnect the battery packs 100 individually with respect to the motor 10. Furthermore, since the coupling member 30 which connects the battery pack 100 with the motor 10 may function as a key box of the battery pack 100, a risk of theft may be reduced.

Figure 6A:
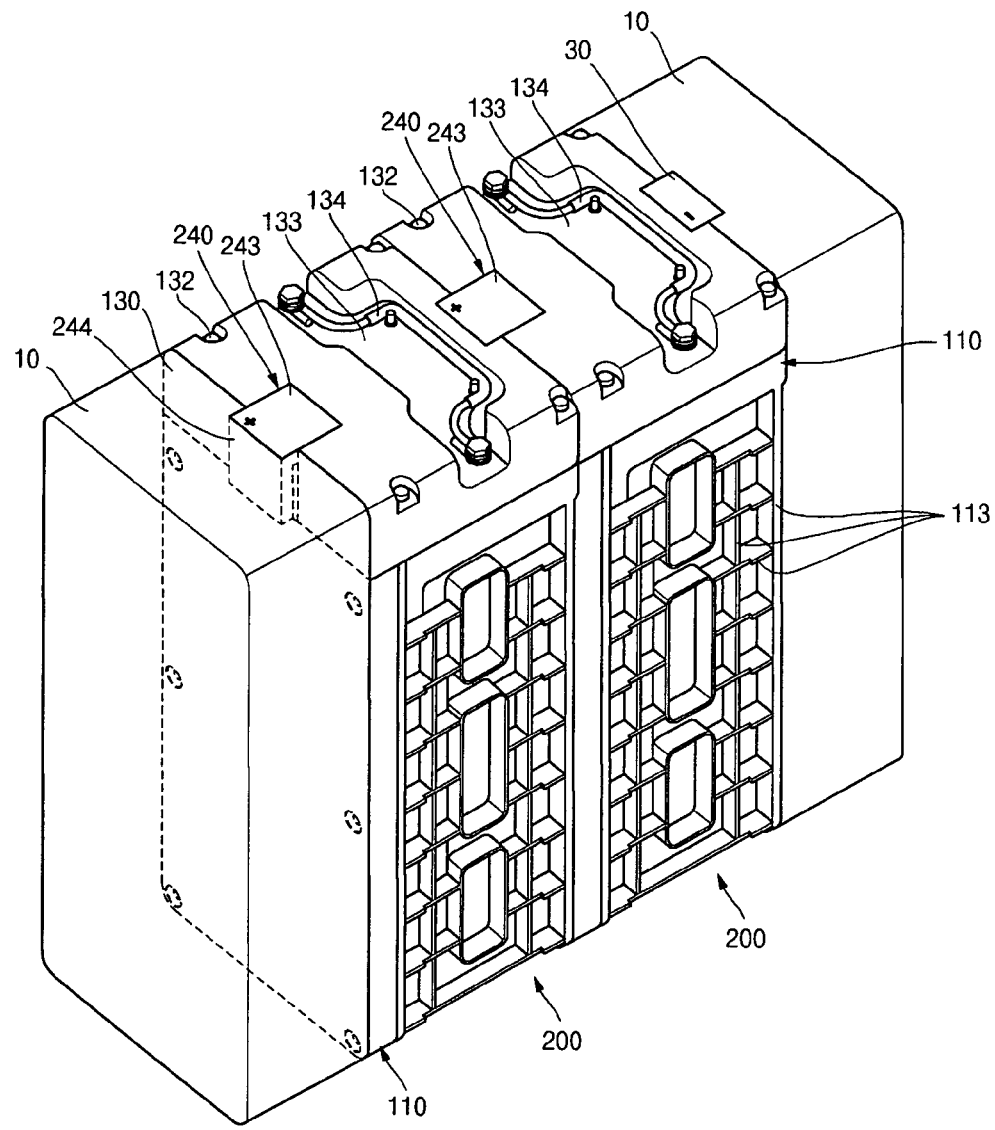
FIG. 6A illustrates a perspective view of a battery pack according to another embodiment connected with an external device.
Figure 6B:
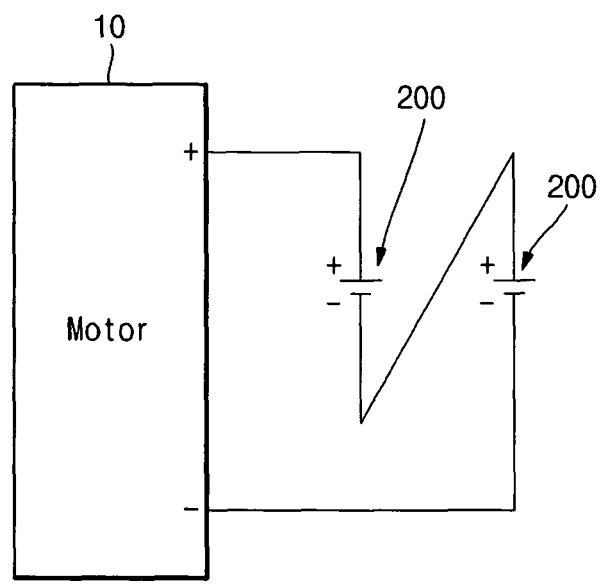
FIG. 6B illustrates a schematic circuit view of a connection state between the battery pack according to another embodiment and the external device.

FIG. 6A illustrates a perspective view of a connection between an external device and a battery pack according to another embodiment. FIG. 6B illustrates a schematic circuit diagram of a connection state between the external device and the battery pack according to the other embodiment.

Referring to FIG. 6A, two battery packs 200 according to another embodiment may be electrically connected to each other, e.g., through a connector 240 of a right battery pack 200 inserted into a connection recess of a left battery pack 200. Here, an anode terminal of the battery pack 200 disposed on the right may be connected to a cathode terminal of the battery pack 200 disposed on the left through the connector 240. That is, the battery packs 200 may be serially connected.

Furthermore, an anode terminal of the left battery pack 200 may be connected to an anode terminal of the motor 10 through the connector 240. In addition, a cathode terminal of the right battery pack 200 may be connected to a cathode terminal of the motor 10 through a coupling member 30. Accordingly, the battery packs 200 being serially interconnected may be connected to the motor 10.

Such connection relations between the battery packs 200 and the motor 10 shown in FIG. 6A may be illustrated by the circuit view of FIG. 6B. For example, when capacities of the battery packs 200 are 24V and 2 kW, respectively, a voltage of about 48V and an electric power of about 4 kW may be supplied to the motor 10 since the battery packs 200 are serially connected.

As described, the battery packs 200 according to another embodiment may be serially interconnected through the connector 240 and the connection recess 136 without requiring a separate wire. Also, since connection and separation of the battery pack 200 is easy, a user may be able to easily separate for charging and reconnect the battery packs 200 individually. Furthermore, since one end of the battery pack 200 is connected with the motor 10 electrically and physically by the coupling member 30, theft of the battery pack 200 may be prevented.

A battery pack according to embodiments may include a connector connected between the battery pack and an external device, so the battery pack is capable of being conveniently connected and separated. That is, the connector may protrude upward of a front cover and bend to extend along an upper surface of an upper cover, and a connection recess disposed at a lower end of the front cover may correspond to the connector. Accordingly, connection of the battery pack to an external device may be conveniently achieved by inserting the connector without requiring a dedicated wire. Additionally, since the battery pack is conveniently connected and separated, a user may be able to easily separate for charging and then reconnect a plurality of the battery packs with respect to a motor. Moreover, since the battery pack is connected with an external device through a coupling member, the coupling member may function as a key box for the battery pack. Therefore, a risk of theft may be reduced.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A battery pack, comprising:
   a housing with a space therein;
   one or more battery cells in the space of the housing, the one or more battery cells being arranged in one direction and electrically connected to one another;
   a battery management system (BMS) substrate mounted to the housing and connected to electrode terminals of the battery cells and configured to control charging and discharging of the battery cells;
   an end plate between the BMS substrate and a front of the one or more battery cells, the end plate allows the one or more battery cells to contact a side wall of the housing;
   an upper cover detachably connected to an upper part of the housing and covering all the battery cells in the housing, the upper cover being above the battery cells and the BMS substrate;
   a connector connected to the BMS substrate, the connector protruding above and extending along an upper surface of the upper cover; and
   a front cover connected to a front of the housing, the BMS substrate being enclosed between the housing and the front cover,
   wherein the front cover includes a connector protruding hole, the connector extending from the BMS substrate and protruding through the connector protruding hole.

2. The battery pack as claimed in claim 1, wherein the connector includes connection terminals on a surface facing the upper cover, the connection terminals being electrically connected with the electrode terminals of the battery cells.

3. The battery pack as claimed in claim 1, wherein the connector includes:
   a connector body disposed parallel with the BMS substrate; and
   a bent part connected to the connector body and disposed parallel with the upper cover, the bent part including connection terminals on a lower surface thereof and connected with the electrode terminals of the battery cells.

4. The battery pack as claimed in claim 1, wherein the BMS substrate is connected to an electrode terminal of a first one of the battery cells and to an electrode terminal of a last one of the battery cells through power lines, the electrode terminals of the first and last battery cells having opposite polarities.

5. The battery pack as claimed in claim 4, wherein the connector is connected to the power lines.

6. The battery pack as claimed in claim 1, wherein the connector overlaps the BMS substrate and the upper surface of the upper cover.

7. The battery pack as claimed in claim 6, wherein the connector electrically connects the BMS substrate to a device external to the battery pack.

8. The battery pack as claimed in claim 7, wherein a portion of the connector overlapping the BMS substrate is connected to the BMS substrate, and a portion of the connector overlapping the upper cover is electrically connected to the external device.

9. The battery pack as claimed in claim 1, wherein the connector has a bent shape, a first portion of the connector being attached to the BMS substrate and being parallel thereto, and a second portion of the connector being bent with respect to the first side and protruding above the upper cover.

10. The battery pack as claimed in claim 1, wherein the front cover includes a connection recess, another connector of an adjacent battery pack corresponding to and connecting to the connection recess.

11. The battery pack as claimed in claim 10, wherein the connection recess is electrically connected with the electrode terminals of the battery cells through the BMS substrate.

12. The battery pack as claimed in claim 10, wherein the connection recess is electrically connected with connection terminals of the connector.

13. The battery pack as claimed in claim 10, further including a coupling member, the coupling member being connected to the connection recess when the front cover is connected with an external device.

14. The battery pack as claimed in claim 13, wherein the coupling member is a key box.

15. The battery pack as claimed in claim 13, wherein the coupling member is connected with at least one of the electrode terminals of the battery cells via the connection recess.

16. The battery pack as claimed in claim 1, wherein the BMS substrate is parallel to and overlaps a major surface of an adjacent battery cell, the upper cover and the BMS substrate being perpendicular to each other.

17. The battery pack as claimed in claim 6, wherein the connector overlaps the upper surface of the upper cover and an outer surface of the BMS substrate, the upper surface of the upper cover and the outer surface of the BMS facing away from the battery cells.

18. The battery pack as claimed in claim 1, wherein the connector and the upper cover are not electrically connected to each other.

* * * * *